(12) United States Patent
Ichikawa et al.

(10) Patent No.: US 7,301,323 B2
(45) Date of Patent: Nov. 27, 2007

(54) QUENCH DETECTION METHOD AND APPARATUS OF SUPERCONDUCTIVE CONDUCTOR

(75) Inventors: Michiharu Ichikawa, Kanagawa (JP); Hiroshi Suzuki, Kanagawa (JP); Toshihiro Takahashi, Kanagawa (JP); Shinichi Mukoyama, Tokyo (JP); Masashi Yagi, Tokyo (JP)

(73) Assignees: Central Research Institute of Electric Power Industry, Tokyo (JP); The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/515,662

(22) Filed: Sep. 5, 2006

(65) Prior Publication Data
US 2007/0053116 A1   Mar. 8, 2007

(30) Foreign Application Priority Data
Sep. 5, 2005   (JP) .............................. 2005-256564

(51) Int. Cl.
*G01N 27/00*   (2006.01)
(52) U.S. Cl. ..................... 324/71.6; 324/521; 505/160
(58) Field of Classification Search ............. 324/76.77, 324/71.6, 521; 361/19
See application file for complete search history.

(56) References Cited

U.S. PATENT DOCUMENTS

| 4,777,437 | A | * | 10/1988 | Tashiro et al. ............... 324/248 |
| 4,855,859 | A | * | 8/1989 | Tixador et al. ................ 361/19 |
| 5,063,472 | A | * | 11/1991 | van Doan et al. ............ 361/19 |
| 5,862,028 | A | * | 1/1999 | Kalsi ........................... 361/19 |

FOREIGN PATENT DOCUMENTS

JP   09-084252   3/1997

\* cited by examiner

*Primary Examiner*—Walter Benson
(74) *Attorney, Agent, or Firm*—Notaro & Michalos PC

(57) ABSTRACT

When supplying electric power to a superconducting cable including a superconducting shield covering a superconductive conductor, a phase A of a current generated by a magnetic field leaking from the superconducting shield and a phase B of a current passing through the superconductive conductor are detected, and a phase difference between the phase A and the phase B is obtained so as to determine that a quench has occurred in the case where a difference between a reference phase difference and the obtained current phase difference exceeds a threshold.

12 Claims, 5 Drawing Sheets

QUENCH DETECTION METHOD AND APPARATUS OF SUPERCONDUCTIVE CONDUCTOR

BACKGROUND OF THE INVENTION

1. Field of the Invention

The present invention relates to a quench detection method and apparatus of a superconductive conductor. More particularly, the present invention relates to the quench detection method and apparatus of a superconducting cable including a superconducting shield covering the superconductive conductor.

2. Description of the Related Art

As for a conventional quench detection method of a superconductive conductor, there is a known method called a bridge method which detects using a quench phenomenon by means of measuring a voltage changing with a quench (superconductor to normal conductor transition). There is a quench detection apparatus, as a superconducting-coil quench detection apparatus using this method, which detects the quench by applying a voltage to serially-connected two superconducting coils (Japanese Patent Laid-Open No. 9-84252).

As shown in FIG. 5, this superconducting-coil quench detection apparatus 100 includes an inverter circuit 108, a smoothing capacitor 109, a breaker 110 and a protective resistance 111, and has a first superconducting coil 101a and a second superconducting coil 101b serially connected thereto. Both the superconducting coils 101a and 101b have a voltage intermittently applied thereto to be excited by a chopper circuit 102, and have circulating current passed through them by a cyclic diode 103 when no voltage is applied. The voltages between terminals of the superconducting coils 101a and 101b are measured by a first voltage measurement amplifier 104a and a second voltage measurement amplifier 104b via voltage waveform shapers 112a and 112b respectively so as to obtain variations of measured values of the voltage measurement amplifiers 104a and 104b with a subtracter 105. And an unbalanced voltage is detected as a variation of a voltage measured value which is an output of the subtracter 105 to detect occurrence of a quench of the superconducting coils 101a and 101b with a counter 106 and a signal generator 107.

As for an actual transmission system, however, a transmission voltage is as high as several hundred thousand volts or even higher as the case may be. Therefore, it is very difficult to measure electric power by a method of electrically connecting to the superconductive conductor. It is not desirable, from a viewpoint of preventing an accident, to detect a quench in the transmission system by a method requiring an electrical connection. Furthermore, in the actual transmission system, an amount of power consumption by a consumer fluctuates constantly so that a change in power in association with the quench is hidden therein. Therefore, it is not possible to measure transmission power directly and detect the quench of the superconductive conductor in a superconducting cable from its fluctuation. From these points, it is not adequate, in the actual transmission system, to use the quench detection method of measuring the transmission power by electrically connecting to the superconductive conductor in the superconducting cable.

Because of the above-mentioned problems, there is a conventional quench detection method targeting a transmission apparatus for the voltage of several hundred volts or so while there is none targeting transmission system facilities for a high voltage of several hundred thousand volts or an extra-high voltage of a million volts or so.

BRIEF SUMMARY OF THE INVENTION

An object of the present invention is to provide a quench detection method and apparatus of a superconductive conductor capable of detecting a quench without being influenced by fluctuation of transmission power in association with power consumption by consumers and also capable of detecting a quench without electrically connecting to the superconductive conductor.

The inventors hereof found out that, while conducting a transmission test of a superconducting cable, occurrence of a quench changes a phase difference generated between a phase of a current generated by a magnetic field leaking from a superconducting shield covering the superconductive conductor of the superconducting cable and a phase of a current passing through the superconductive conductor, and the change in the phase difference shows the same trend as change in the transmission power generated by the quench.

The quench detection method of a superconductive conductor of the present invention is based on the above-mentioned knowledge, on supplying electric power to the superconducting cable including the superconducting shield covering the superconductive conductor, the method comprising steps of: detecting a phase A of the current generated by the magnetic field leaking from the superconducting shield and a phase B of the current passing through the superconductive conductor; and obtaining the phase difference between the phase A and the phase B; and determining that a quench has occurred when the change in the phase difference exceeds a threshold.

The quench detection apparatus of a superconductive conductor of the present invention includes a first phase detector for detecting the phase A of the current generated by the magnetic field leaking from the superconducting shield of the superconducting cable including the superconducting shield covering the superconductive conductor, a second phase detector for detecting the phase B of the current passing through the superconductive conductor, a phase difference detector for obtaining the phase difference between the phase A and the phase B, and a determiner for determining that a quench has occurred when the change in the phase difference exceeds a threshold.

Therefore, according to the quench detection method and apparatus of a superconductive conductor of the present invention, it is possible to determine the occurrence of a quench on the superconducting cable by monitoring the phase difference between the phase of the current generated by the magnetic field leaking from the superconducting shield and the phase of the current passing through the superconductive conductor. To be more specific, it is possible to determine whether or not the quench has occurred by measuring the change in the phase difference of the current generated by the magnetic field so as to detect the quench without electrically connecting to the superconductive conductor. It is further possible to detect the quench without being influenced by the fluctuation of transmission power in association with power consumption by a consumer. Therefore, it is possible to detect the quench of a power cable of the transmission system from high voltage to ultrahigh voltage or UHV.

DETAILED DESCRIPTION OF THE INVENTION

Figure 1:
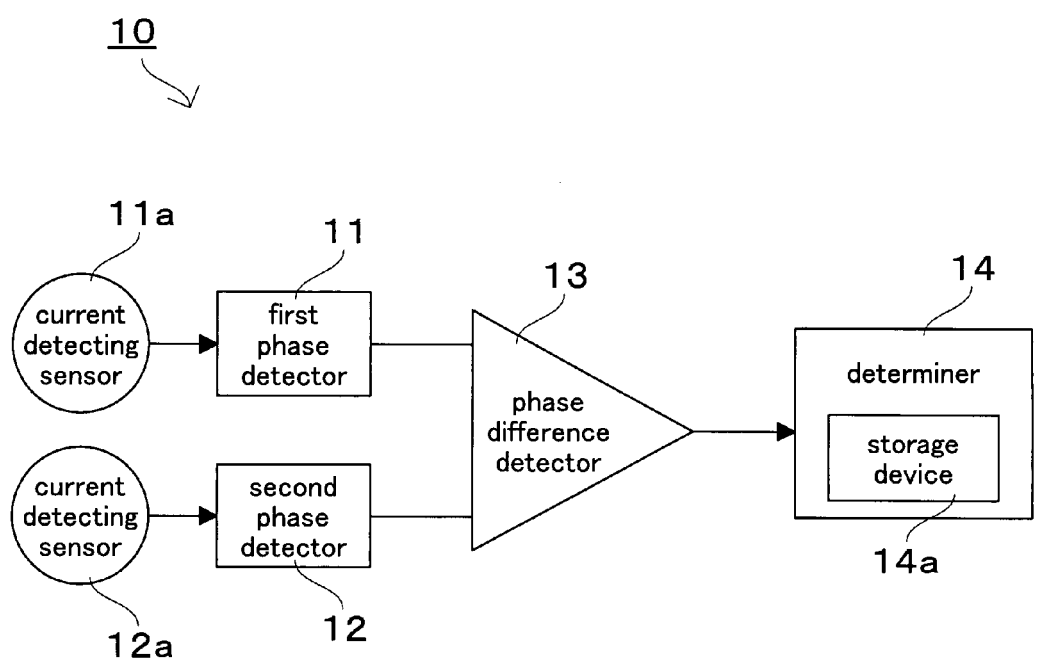
FIG. 1 is a schematic block diagram showing an example of an embodiment of a quench detection apparatus of a superconductive conductor of the present invention.

Hereunder, a configuration of the present invention will be described in detail based on preferred embodiments shown in the drawings.

Figure 2:
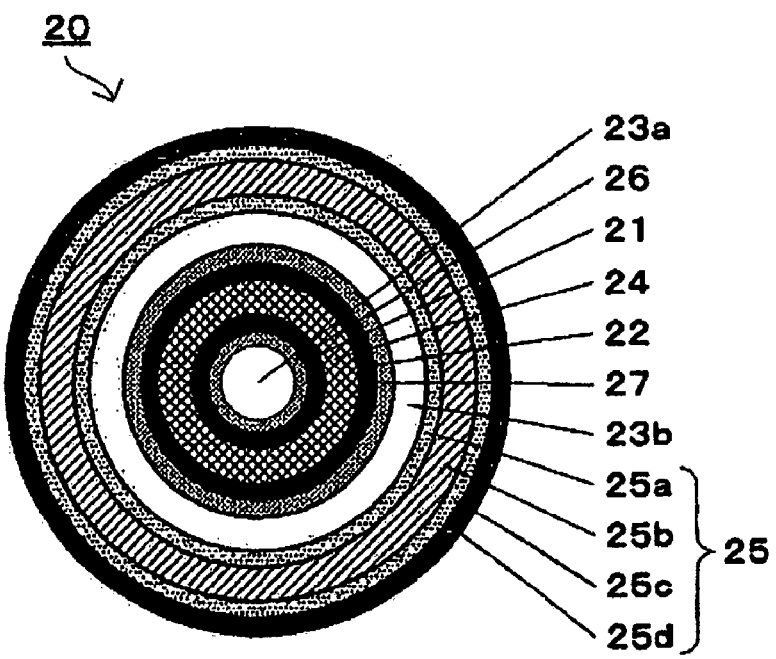
FIG. 2 is a sectional view showing an example of a superconducting cable.

FIGS. 1 to 4 show an embodiment of a quench detection method and apparatus of a superconductive conductor of the present invention. This embodiment will be described by exemplifying the case where a superconducting cable 20 having a section shown in FIG. 2 is used as an example of the superconducting cable to which the present invention is applicable so as to detect a quench of a superconductive conductor 21 in the superconducting cable 20.

FIG. 1 shows an example of a schematic configuration of a quench detection apparatus 10 of a superconductive conductor according to this embodiment. The quench detection apparatus 10 detects a quench of the superconducting cable 20 including a superconducting shield 22 covering the superconductive conductor 21. The quench detection apparatus 10 is configured by a first phase detector 11 for detecting a phase A of a current generated by a magnetic field leaking from the superconducting shield 22, a second phase detector 12 for detecting a phase B of the current passing through the superconductive conductor 21, a phase difference detector 13 for detecting a phase difference between the phase A and the phase B, and a determiner 14 for determining whether or not a quench has occurred based on change in the phase difference.

As shown in FIG. 2, the superconducting cable 20 has the superconductive conductor 21 provided therein to cover the outside of a former 26 which is a core material.

The former 26 is configured by a copper strand in order to keep a mechanical structure and shunt the current when a superconductive state is lost. The former 26 has a hollow structure, where the hollow portion is a cooling medium channel 23a in which liquid nitrogen flows in this embodiment.

The superconducting cable 20 has the superconductive conductor 21 surrounded by an electrical insulating layer 24, the superconducting shield 22 and a protective layer 27 configured by a copper-braided wire for the sake of shunting the current when the superconductive state is lost. Furthermore, the outside of the protective layer 27 is covered by a heat-insulating inner tube 25a, and a cooling medium channel 23b is formed by the protective layer 27 and the heat-insulating inner tube 25a. Liquid nitrogen flows in the cooling medium channel 23b in this embodiment.

Furthermore, the superconducting cable 20 has a heat-insulating tube 25 outermost, consisting of the heat-insulating inner tube 25a, a vacuum heat-insulating tube 25b, a heat-insulating outer tube 25c and an anticorrosion layer 25d.

The superconductive conductor 21 is a conductor made by wrapping a Bi2223 silver-alloy sheath tape around the former 26 which is the core material (Bi2223: Bi2Sr2Ca2Cu3O10+z). The electrical insulating layer 24 is an insulator formed by wrapping insulating paper such as semi-synthetic paper around it for instance. The superconducting shield 22 is formed by wrapping the Bi2223 silver-alloy sheath tape around the electrical insulating layer 24 as with the superconductive conductor 21.

The heat-insulating tube 25 accommodates the superconductive conductor 21, superconducting shield 22 and the like covered by the protective layer 27 in the hollow portion. The heat-insulating inner tube 25a and heat-insulating outer tube 25c configuring the heat-insulating tube 25 are made of stainless steel. The vacuum heat-insulating layer 25b which is a vacuum layer is provided between the heat-insulating inner tube 25a and the heat-insulating outer tube 25c. The anticorrosion layer 25d covering the outside of the heat-insulating outer tube 25c is a cover made of a polymer resin such as vinyl chloride.

As for the superconducting cable 20, if the current passes through the superconductive conductor 21, the magnetic field is generated around it so that, even in the superconductive state, an eddy-current loss occurs because the magnetic field gets interlinked with structural objects and the like around the heat-insulating inner tube 25a, heat-insulating outer tube 25c and superconducting cable 20. To prevent this phenomenon, the superconducting shield 22 is provided around the superconductive conductor 21 to seal off the magnetic field generated from the superconductive conductor 21. Most kinds of superconducting cables include the superconductive conductor and the superconducting shield covering it.

In reality, however, even the superconducting shield 22 cannot completely seal off the magnetic field generated from the superconductive conductor 21, and so a little leakage magnetic field is generated around the superconducting cable 20.

The first phase detector 11 includes a current detecting sensor 11a for detecting an AC magnetic field and detecting a current by electromotive force responding to the AC magnetic field. The first phase detector 11 measures the phase A of the current detected by the current detecting sensor 11a. A current transformer is used as the current detecting sensor 11a for instance.

The current detecting sensor 11a is placed on a periphery of the superconducting cable 20 of a zone in which the superconductive conductor 21 is covered by the superconducting shield 22. The current detecting sensor 11a detects the current generated by the magnetic field leaking from the superconducting shield 22. The current detecting sensor 11a should be placed on the periphery of the superconducting cable 20 close enough to be able to detect the leakage magnetic field from the superconducting shield 22.

Thus, the first phase detector 11 measures the phase A of the current generated by the magnetic field leaking from the superconducting shield 22 in the zone in which the superconductive conductor 21 is covered by the superconducting shield 22.

The second phase detector 12 includes a current detecting sensor 12a for detecting an AC magnetic field and detecting a current by electromotive force responding to the AC magnetic field. The second phase detector 12 measures the phase B of the current detected by the current detecting sensor 12a. As with the current detecting sensor 12a, a current transformer is used as the current detecting sensor 11a for instance.

The current detecting sensor 12a detects the magnetic field generated by the current passing through the superconductive conductor 21. In the case where a power line is connected to the superconductive conductor 21, the phase of the current passing through the superconductive conductor 21 is the same as the phase of the current passing through the power line. Therefore, the magnetic field may be detected by the current detecting sensor 12a either by detecting the magnetic field generated from the superconductive conductor 21 in the zone in which the superconductive conductor 21 is not covered by the superconducting shield 22 or by detecting the magnetic field generated from the power line connected to the superconductive conductor 21. As for an actual usage state, it is assumed that a cable termination portion for connecting a cooling system for cooling the inside of the superconducting cable 20 and other electric devices to the superconducting cable 20 is installed at an end of the superconducting cable 20 laid into a substation or at a mutual connecting point of the superconducting cables 20. Therefore, it is possible to detect the magnetic field of the superconductive conductor 21 by installing the current detecting sensor 12a on the periphery of the power line connected to the cable termination portion.

The first phase detector 11 and the second phase detector 12 are connected to the phase difference detector 13. The phase difference detector 13 compares data on the phase A measured by the first phase detector 11 with data on the phase B measured by the second phase detector 12 so as to acquire the phase difference between them (hereafter, merely referred to as the phase difference as appropriate).

The determiner 14 determines whether or not a quench has occurred to the superconductive conductor 21 based on the change in the phase difference detected by the phase difference detector 13. The determiner 14 comprises a storage device 14a for storing a reference phase difference used on determining whether or not the quench has occurred.

A determination on whether or not a quench has occurred is made by comparing a current phase difference actually measured while supplying electric power to the superconducting cable 20 with the reference phase difference. To be more precise, there are a thinkable method of determining it based on a difference in the phase difference at specified time intervals and another thinkable method of determining it based on a difference from the phase difference in a predetermined state. It is also possible to determine whether or not a quench has occurred based on only one of the difference in the phase difference at specified time intervals and the difference from the phase difference in the predetermined state or determine whether or not a quench has occurred by combining both.

For instance, in the case of determining it based on the difference in the phase difference at specified time intervals, the phase difference between the phase A and the phase B is continuously measured while supplying the electric power to the superconducting cable 20, and is recorded on the storage device 14a while updating the phase difference of a time point earlier than energization time by a certain time period as the reference phase difference. It is determined that the quench has occurred to the superconductive conductor 21 in the case where the difference between the reference phase difference and the current phase difference exceeds a threshold. To be more precise, it is thinkable to render the phase difference at 30 seconds earlier than current time as the reference phase difference and determine that the quench has occurred in the case where the difference between the reference phase difference and the current phase difference exceeds 0.2 degrees. However, the specified time intervals and the threshold of the difference in the phase difference for determination are not limited thereto. The specified time intervals for determination may be either shorter or longer than that and the threshold of the difference in the phase difference may be either smaller or larger than that according to the characteristics and the size of the reference phase difference of the superconducting cable to which the present invention is applied.

In the case of determining it based on a difference from the phase difference in a predetermined state, the phase difference between the phase A and the phase B is previously stored in the storage device 14a as the reference phase difference while supplying the electric power in the state in which apparently no quench has occurred or in the state in which presumably no quench has occurred to the superconductive conductor 21 so as to compare the reference phase difference with the current phase difference. And it is determined that the quench has occurred in the case where the difference between the reference phase difference and the current phase difference exceeds the threshold. In this case, it is possible to detect the quench even if the quench has already occurred on starting measurement of the phase difference and the phase difference is stable in the state in which the quench has occurred so as to detect the quench more securely. As for the threshold, the difference between the reference phase difference and the current phase difference may be either 0.2 degrees or 1% of the reference phase difference. However, the threshold is not limited thereto but may be smaller or larger than that.

Furthermore, in the case of determining it based on the difference from the phase difference in the predetermined state in addition to the difference in the phase difference at specified time intervals, it is determined that the quench has occurred in the case where the difference in the phase difference at the specified time intervals exceeds the threshold and the phase difference further increases thereafter or the phase difference becomes stable in the increased state. In this case, it is possible to make a more correct determination because it is not determined that the quench has occurred in the case where, as an unexpected change in the phase difference, the phase difference increases and exceeds the threshold at the specified time intervals and then returns to the former state.

EXAMPLE

A description will be given by using FIGS. 3 and 4 as to an example of the quench detection method and apparatus of a superconductive conductor of the present invention applied to an actual test line.

This example was implemented by using a superconducting cable field test line (hereunder, referred to as the test line) laid in Electric Power Engineering Research Laboratory, Central Research Institute of Electric Power Industry, JAPAN.

Figure 3:
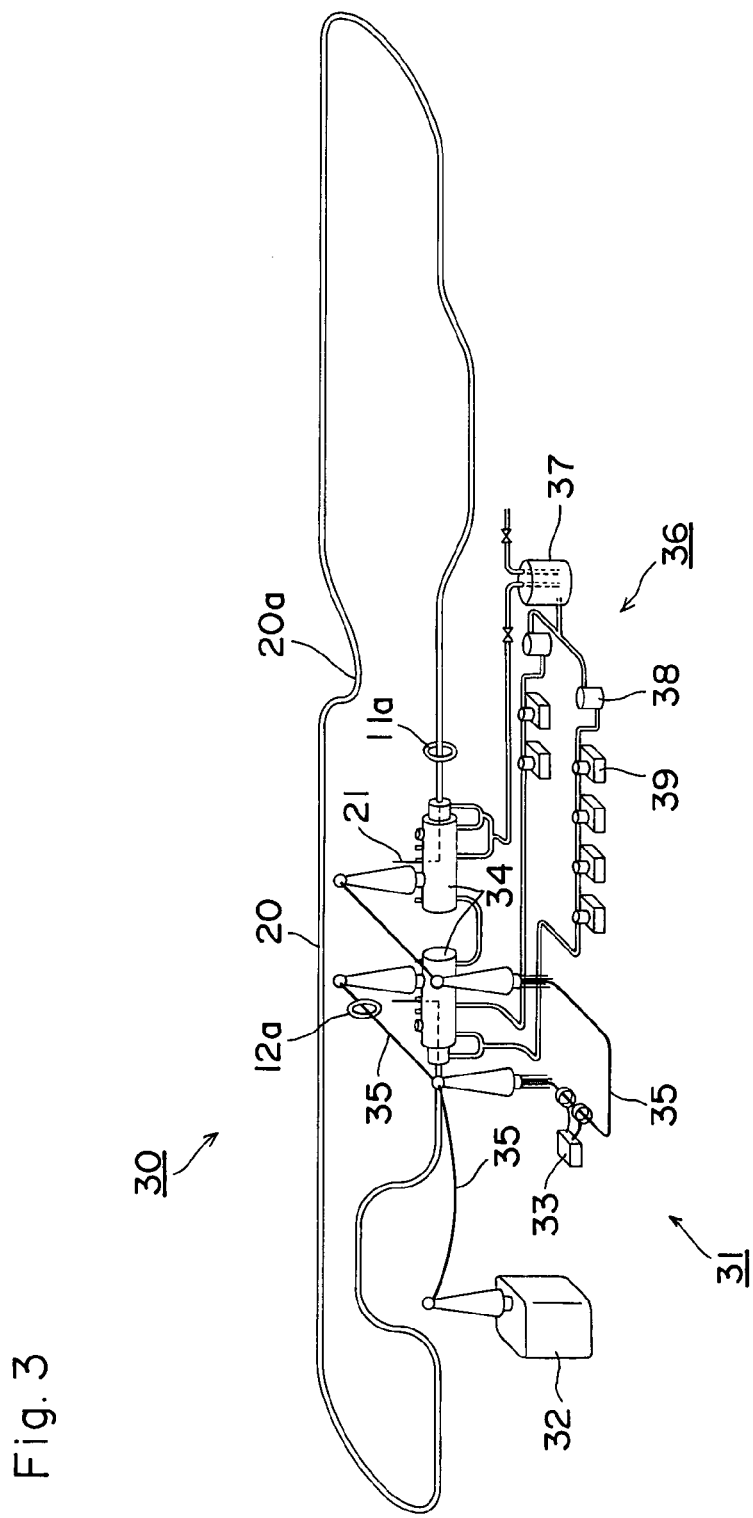
FIG. 3 is a block diagram of a test line of an example.

As shown in FIG. 3, this test line 30 was configured by the superconducting cable 20, charging and energizing facilities 31 and a cooling system 36. While FIG. 3 does not show the entire apparatus, the quench detection apparatus 10 was placed.

The configuration of the superconducting cable 20 used in this example was as shown in FIG. 2, which is a type covering the superconductive conductor 21 with the superconducting shield 22. An overall length of the superconducting cable 20 was 500 m.

The charging and energizing facilities 31 was configured by a charging apparatus 32, an energizing apparatus 33 and two cable termination portions 34. The charging apparatus 32 and the two cable termination portions 34 were connected by a XLPE cable (cross-linked polyethylene insulated polyvinyl-chloride sheathed cable) 35 which was a normal conductor, and the energizing apparatus 33 was provided to the XLPE cable 35 connecting the two cable termination portions 34.

The superconducting cable 20 was connected to the cable termination portions 34, and the cable termination portions 34 were connected to the charging apparatus 32 by the XLPE cable 35 so that charging and energization were performed at voltage of 77 kV and currents of 1 kA.

The cooling system 36 was intended to supply liquid nitrogen to the cooling medium channels 23a and 23b of the superconducting cable 20 by a liquid nitrogen pressurized circulation method and thereby cool the inside of the superconducting cable 20. The cooling system 36 comprised a liquid nitrogen tank 37, electric pumps 38 and refrigerating machines 39.

According to this example, the current transformer was used as the current detecting sensor 11a of the first phase detector 11 for detecting a magnetic flux leaking from the superconducting shield 22. A position for installing the current detecting sensor 11a may be any position of the superconducting cable 20 if it is the zone in which the superconductive conductor 21 is covered by the superconducting shield 22. In this example, the current detecting sensor 11a was placed on the periphery of the superconducting cable 20 close to the cable termination portions 34 to facilitate the measurement, and so it detected the current generated by the leakage magnetic field from the superconducting shield 22 (position of reference character 11a in FIG. 3).

The current transformer was also used as the current detecting sensor 12a of the second phase detector 12 for detecting the phase of the current passing through the superconductive conductor 21. As described, the current detecting sensor 12a was intended to detect the magnetic field generated by the current passing through the superconductive conductor 21. The phase of the current passing through the superconductive conductor 21 was the same as the phase of the current passing through the power line connected to the superconductive conductor 21. Thus, in this example, the current detecting sensor 12a was installed on the periphery of the XLPE cable 35 between the charging apparatus 32 and the cable termination portions 34 (position of reference character 12a in FIG. 3).

In this example, the phase difference detector 13 first detected the phase difference between the phase A detected by the current detecting sensor 11a and the phase B detected by the current detecting sensor 12a on supplying the electric power in the state in which presumably no quench has occurred to the superconductive conductor 21 so as to store the phase difference as the reference phase difference in the storage device 14a of the determiner 14.

Next, a local magnetic field was applied to the superconducting cable 20 around the middle (position of reference character 20a in FIG. 3) of the superconducting cable 20 so as to generate the quench artificially to the superconductive conductor 21. The location where the quench is generated is for convenience of implementation and is not limited to the location of this example.

Figure 4:
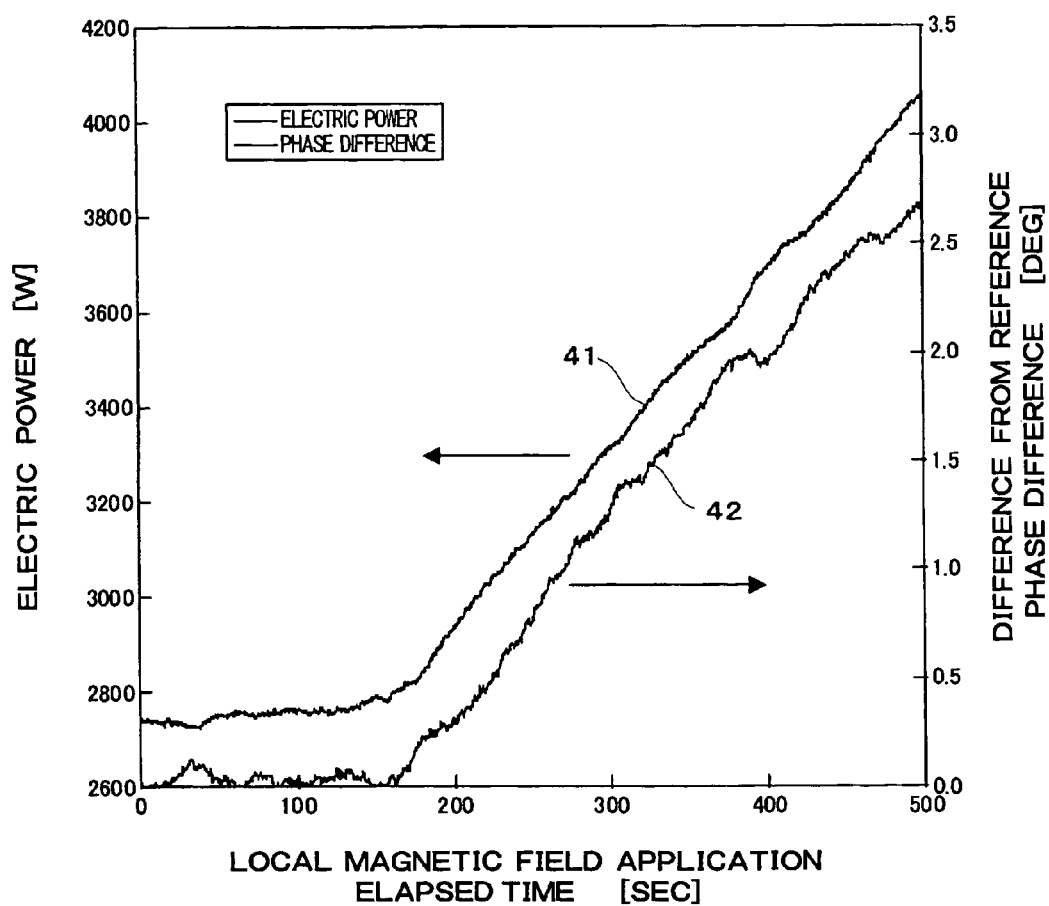
FIG. 4 is a diagram showing change in a difference between transmission power and a reference phase difference in association with elapse of application time of a local magnetic field.
Figure 5:
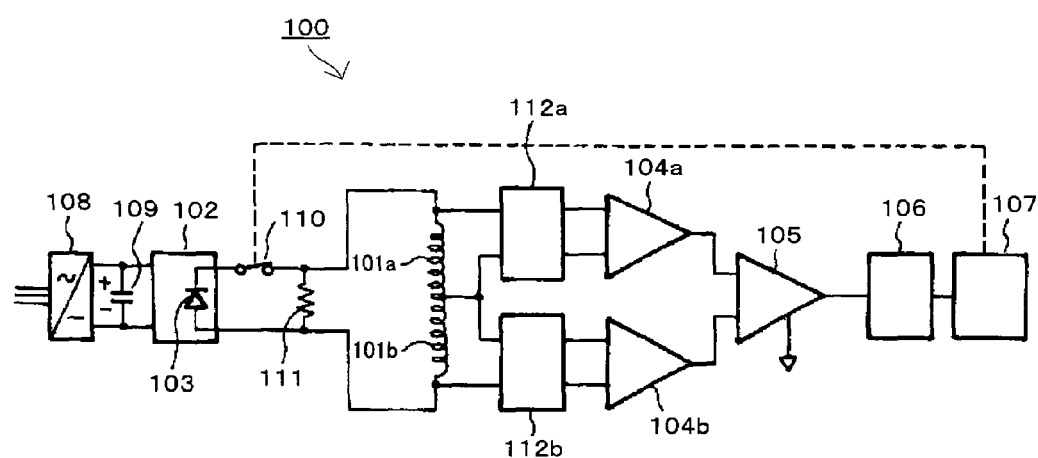
FIG. 5 is a schematic block diagram of a conventional quench detection apparatus of a superconducting coil.

A result shown in FIG. 4 was obtained as the change in the transmission power of the superconducting cable 20 and the change in the difference between the reference phase difference and the phase difference in a quench state (hereafter, referred to as the difference from the reference phase difference) with elapse of time when applying a local magnetic field to the superconductive conductor 21.

The horizontal axis of FIG. 4 represents time elapsed from starting application of a local magnetic field to the superconducting cable 20, where the time point for starting application of the local magnetic field is 0 second. A solid line 41 in FIG. 4 represents the change in the transmission power (the numerical axis is the left axis, unit [W]) while solid line 42 represents the change in the difference from the reference phase difference (the numerical axis is the right axis, unit [degree]).

As shown in FIG. 4, the transmission power was kept almost constant until about 150 seconds elapsed from applying the local magnetic field and generating the quench artificially, and the increase started when about 150 seconds elapse. Thus, the transmission power started to increase when about 150 seconds elapsed after applying the local magnetic field. This was the time required for the quench to progress to the extent of influencing the transmission power from starting the application of the local magnetic field.

The difference from the reference phase difference was also kept almost constant until about 150 seconds elapsed from applying the local magnetic field and generating the quench artificially, and the increase started when about 150 seconds elapsed.

Furthermore, there was also a similar gradual increase as to the change in the transmission power and the change in the difference from the reference phase difference after the elapse of about 150 seconds.

As for this result, there was almost a match between the timing and trend in the increase in the transmission power and the timing and trend in the increase in the difference from the reference phase difference with generation of the quench in the superconductive conductor 21. To be more specific, it is possible, without measuring the voltage of the superconducting cable 20 directly, to detect the phase A of the current generated by the magnetic field leaking from the superconducting shield 22 and the phase B of the current passing through the superconductive conductor 21 so as to determine whether or not the quench in the superconductive conductor 21 has occurred based on the phase difference between the phases.

To be more specific, the local magnetic field was purposely applied to generate the quench forcibly so that the transmission power increased by over 3% from about 2800 W to about 2900 W, and the difference between the detected phase difference and the reference phase difference when the transmission power was influenced was about 0.2 degrees. From this, it is possible to determine that the quench is generated in the superconductive conductor 21 in the case where the difference between the detected phase difference and the reference phase difference exceeds 0.2 degrees.

According to this example, it is thinkable that the superconductive conductor 21 was in the quench state in the range of about 2 m to about 3 m thereof when 500 seconds elapsed from starting application of the local magnetic field. The difference between the phase difference and the reference phase difference at that time point was about 2.7 degrees. Therefore, if the difference of 0.2 degrees from the reference phase difference is the threshold of whether or not the quench has occurred, it is possible to detect the quench of the superconducting cable 20 in the range of 20 cm or so.

It is confirmed from this result that the overall length of the superconducting cable 20 of the test line 30 in this example was 500 m and the quench in the range of less than 0.1% thereof was detectable so that the quench detection method was sufficiently accurate.

The above-mentioned embodiment is an example of the preferred embodiments of the present invention. However, the present invention is not limited thereto but various deformations may be implemented without departing from the scope of the invention. For instance, the superconductive state is destroyed by applying the local magnetic field according to the example. However, the same result can be obtained even in the case where the superconductive state is destroyed for another reason and the quench is generated.

What is claimed is:

1. A quench detection method of a superconductive conductor, on supplying electric power to a superconducting cable including a superconducting shield covering the superconductive conductor, the method comprising steps of: detecting a phase A of a current generated by a magnetic field leaking from the superconducting shield and a phase B of a current passing through the superconductive conductor; and obtaining a phase difference between the phase A and the phase B; and determining that a quench has occurred to the superconductive conductor when a difference between a reference phase difference and the obtained current phase difference exceeds a threshold.

2. The quench detection method of a superconductive conductor according to claim 1, wherein the reference phase difference is the phase difference between the phase A and the phase B while supplying electric power in a state in which apparently no quench has occurred or in a state in which presumably no quench has occurred to the superconductive conductor.

3. The quench detection method of a superconductive conductor according to claim 2, wherein the threshold is 0.2 degrees.

4. The quench detection method of a superconductive conductor according to claim 1, wherein the reference phase difference is the phase difference between the phase A and the phase B obtained a certain time earlier than current time.

5. The quench detection method of a superconductive conductor according to claim 1, wherein the threshold is 0.2 degrees.

6. The quench detection method of a superconductive conductor according to claim 4, wherein the threshold is 0.2 degrees.

7. A quench detection apparatus of a superconductive conductor, comprising:
   a first phase detector for detecting a phase A of a current generated by a magnetic field leaking from a superconducting shield of a superconducting cable including the superconducting shield covering the superconductive conductor;
   a second phase detector for detecting a phase B of a current passing through the superconductive conductor;
   a phase difference detector for obtaining a phase difference between the phase A and the phase B; and
   a determiner for determining that a quench has occurred to the superconductive conductor when a difference between a reference phase difference and the obtained current phase difference exceeds a threshold.

8. The quench detection apparatus of a superconductive conductor according to claim 7, wherein the reference phase difference is the phase difference between the phase A and the phase B while supplying electric power in a state in which apparently no quench has occurred or in a state in which presumably no quench has occurred to the superconductive conductor.

9. The quench detection apparatus of a superconductive conductor according to claim 8, wherein the threshold is 0.2 degrees.

10. The quench detection apparatus of a superconductive conductor according to claim 7, wherein the reference phase difference is the phase difference between the phase A and the phase B obtained a certain time earlier than current time.

11. The quench detection apparatus of a superconductive conductor according to claim 10, wherein the threshold is 0.2 degrees.

12. The quench detection apparatus of a superconductive conductor according to claim 7, wherein the threshold is 0.2 degrees.

* * * * *